United States Patent [19]

Wedman

[11] 3,898,490
[45] Aug. 5, 1975

[54] SUPERCONDUCTIVE AC DYNAMOELECTRIC MACHINES HAVING TWO ROTORS

[75] Inventor: Leonard N. Wedman, Murrysville, Pa.

[73] Assignee: Westinghouse Electric Corporation, Pittsburgh, Pa.

[22] Filed: Sept. 24, 1973

[21] Appl. No.: 399,883

[52] U.S. Cl. ................................. 310/52; 310/114
[51] Int. Cl. ............................................. H02k 9/00
[58] Field of Search ......... 310/10, 40, 52, 211, 114, 310/125, 126, 198, 266, 165; 322/90; 321/28

[56] References Cited
UNITED STATES PATENTS

| | | | |
|---|---|---|---|
| 2,864,016 | 12/1958 | Waltscheff | 310/126 |
| 3,005,117 | 10/1961 | Buchhold | 310/40 |
| 3,312,846 | 4/1967 | Henry-Baudot | 310/266 |
| 3,445,699 | 5/1969 | Beaudry | 310/266 |
| 3,521,091 | 7/1970 | Halas | 310/40 |
| 3,644,766 | 2/1972 | Hughes | 310/40 |
| 3,679,920 | 7/1972 | MacNab | 310/10 |
| 3,742,265 | 6/1973 | Smith | 310/52 |
| 3,764,835 | 10/1973 | Luck | 310/10 |

*Primary Examiner*—R. Skudy
*Attorney, Agent, or Firm*—G. H. Telfer

[57] ABSTRACT

An AC dynamoelectric machine is constructed with a stator and a pair of rotors. The inner rotor is connected to the drive shaft of the machine and has an induction winding, such as a squirrel cage winding. Between the inner rotor and the stator there is located a second rotor that is essentially free floating. The second or intermediate rotor is provided with a superconducting field winding.

9 Claims, 2 Drawing Figures

SUPERCONDUCTIVE AC DYNAMOELECTRIC MACHINES HAVING TWO ROTORS

BACKGROUND OF THE INVENTION

1. Field of the Invention:

This invention relates generally to superconducting electrical machinery, and more specifically, this invention relates to a superconductive AC machine having a pair of rotors to permit efficient operation in both the synchronous and asynchronous modes.

2. Description of the Prior Art:

Within the last ten or twelve years, considerable interest has arisen in utilizing the extremely low electrical resistance state that certain materials exhibit at cryogenic temperatures, known as superconductivity, in the construction of dynamoelectric machinery. As a result of the extremely high magnetic fields that can be produced by utilization of the superconductive effect, prior art efforts in the superconductive machinery field have been directed toward the utilization of an essentially all air gap structure in which ferromagnetic material is not utilized, except, perhaps, as an external shield to contain radiation. Such efforts have produced dynamoelectric machines that operate reasonably well as synchronous AC motors. However, these machines do not operate effectively during the asynchronous mode of operation encountered during starting or in the presence of transient conditions.

One of the difficulties encountered when an all air gap construction is utilized for an AC motor is that the torque produced during asynchronous operation is relatively small. This results from the fact that during starting the machine operates as an induction motor with a conventional strength (or even smaller) AC magnetic field. Since the conventional strength field has a magnetic flux density that is only a small fraction of that produced by the superconductive winding, the lack of a ferromagnetic path results in very inefficient utilization of the relatively small amount of flux available. Accordingly, the torque produced during this phase is relatively quite small. Another problem that arises during asynchronous operation of a superconductive AC motor is that relatively low frequency AC magnetic fields, such as those produced at slightly sub-synchronous speeds, penetrate into the superconductive winding. Since superconductivity is essentially a DC phenomenon, the introduction of AC fields results in relatively high energy losses that are unacceptable. Not only are the losses undesirable; they may result in "quenching" or loss of the superconductive effect. To remove these AC losses and retain the superconductivity of the winding, large amounts of the expensive cryogenic refrigerant are required.

In spite of the foregoing difficulties, the significant size, cost and weight benefits of a superconductive machine, as compared to conventional machines, still offers tantalizing possibilities for applications such as low speed ship propulsion. In such an embodiment, a motor must be capable of self-starting and crash reversal under high torque, high inertia loads.

Many attempts have been made to produce a superconductive AC machine that would yield the desired operating characteristics. One approach that has yielded some beneficial results is to move the superconducting winding radially inward, away from the stator AC field. In addition, a magnetic path for asynchronous AC fields is provided above the superconducting winding to shunt AC fields across the top of the winding. This configuration causes a drop in synchronous output in approximate proportion to the ratio of the stator-rotor winding air gap/pole to the pitch. In low speed machines, this gap/pitch ratio is relatively large, causing an undesired decrease in synchronous output, although a reduction in AC losses may be obtained. Examples of this approach may be found in copending U.S. Pat. applications Ser. No. 327,520 and Ser. No. 327,540, both filed on Jan. 29, 1973 and assigned to the same assignee as the subject application.

Another approach that has been utilized in attempting to reduce the AC losses in a superconducting field winding is to utilize two separate armatures. The stator is a wound armature that produces a rotating field. An inner superconducting rotor is free to rotate synchronously, while a second ambient temperature armature located between the rotor and the stator is coupled to the drive shaft and is arranged to rotate asynchronously. With this arrangement, the superconducting winding is virtually free from AC losses. High frequency AC fields are attenuated by the rotary armature and the time that the uncoupled superconductive rotor is exposed to the AC fields is short. However, the air gap required to place the ambient temperature rotating armature between the superconducting rotor and the stator significantly reduces the magnetic coupling between the stator and the superconducting field winding. This type of approach is exemplified by U.S. Pat. No. 3,742,265 - Smith, Jr., issued on June 26, 1973.

Therefore, while prior art devices have been developed to reduce AC losses in a superconducting field winding, they have been accompanied by significant decreases in the synchronous output of the machines, particularly in low speed applications.

SUMMARY OF THE INVENTION

The present invention provides a superconductive alternating current (AC) dynamoelectric machine in which AC losses during the asynchronous mode of operation are minimized, without the adverse effects on the synchronous output that result from prior art approaches. As described herein, the invention will be exemplified by a superconductive AC motor, although the principal could be applied equally well to a generator. The motor of this invention is located in a housing on which a relatively conventional stator, having a stator or armature winding, is mounted. For this particular embodiment, a generally cylindrical stator is utilized, although the invention is not limited to this structure. A first rotor, also generally cylindrical and mounted coaxially with, but having a lesser radial dimension than the stator, is connected to the drive shaft of the machine. This connection is made by means of a generally circular endplate at one end of the first rotor. This first rotor includes an induction winding, such as a squirrel cage winding with shorted end turns.

A second rotor includes a superconducting field winding and is mounted on a non-load bearing support shaft. The second rotor is also generally cylindrical and is located between the stator and the first rotor. The second rotor is connected to the support shaft by an endplate located opposite the end plate of the first rotor. Field current and the cryogenic refrigerant are conveyed to the superconducting field winding through the support shaft and the endplate of the second rotor. In order to accurately position the second rotor between the stator and the first rotor, an extending flange is located at the other end of the second rotor and is supported on the housing by a mounting permitting rotary motion with respect to the housing. The second rotor itself may be formed of inner and outer shells which form a chamber therebetween to contain the superconducting field winding and magnetic material forming magnetic poles. The outer shell adjacent the stator will be made of a conductive material to act as a induction winding during start-up of the machine.

With this arrangement, the unloaded second rotor with the superconducting field winding will be brought up to synchronous speed very rapidly, so that the AC losses during the asynchronous start-up are minimal. When the second or outer rotor reaches synchronous speed, field current is applied to the superconducting winding. The flux generated by the superconducting winding couples with the inner or first rotor causing it to produce power for the drive shaft. Since the outer rotor carrying the superconducting winding remains in synchronism with the armature field during start-up of the inner or drive rotor, there are no AC losses in the superconductive winding during this period of operation. Therefore, AC losses in the superconducting winding are greatly minimized, while still obtaining close coupling between the superconducting field winding and the armature winding for improved performance at synchronous speed. In addition, in a case where there is no field current for the superconducting winding, such as would occur with loss of refrigeration, this motor could still operate as a reluctance-asynchronous motor at reduced power level, thus preventing loss of all power.

The foregoing and other objects, advantages, and features of this invention will hereinafter appear, and for purposes of illustration, but not of limitation, an exemplary embodiment of the subject invention is shown in the appended drawing.

DETAILED DESCRIPTION OF THE PREFERRED EMBODIMENTS

Figure 1:
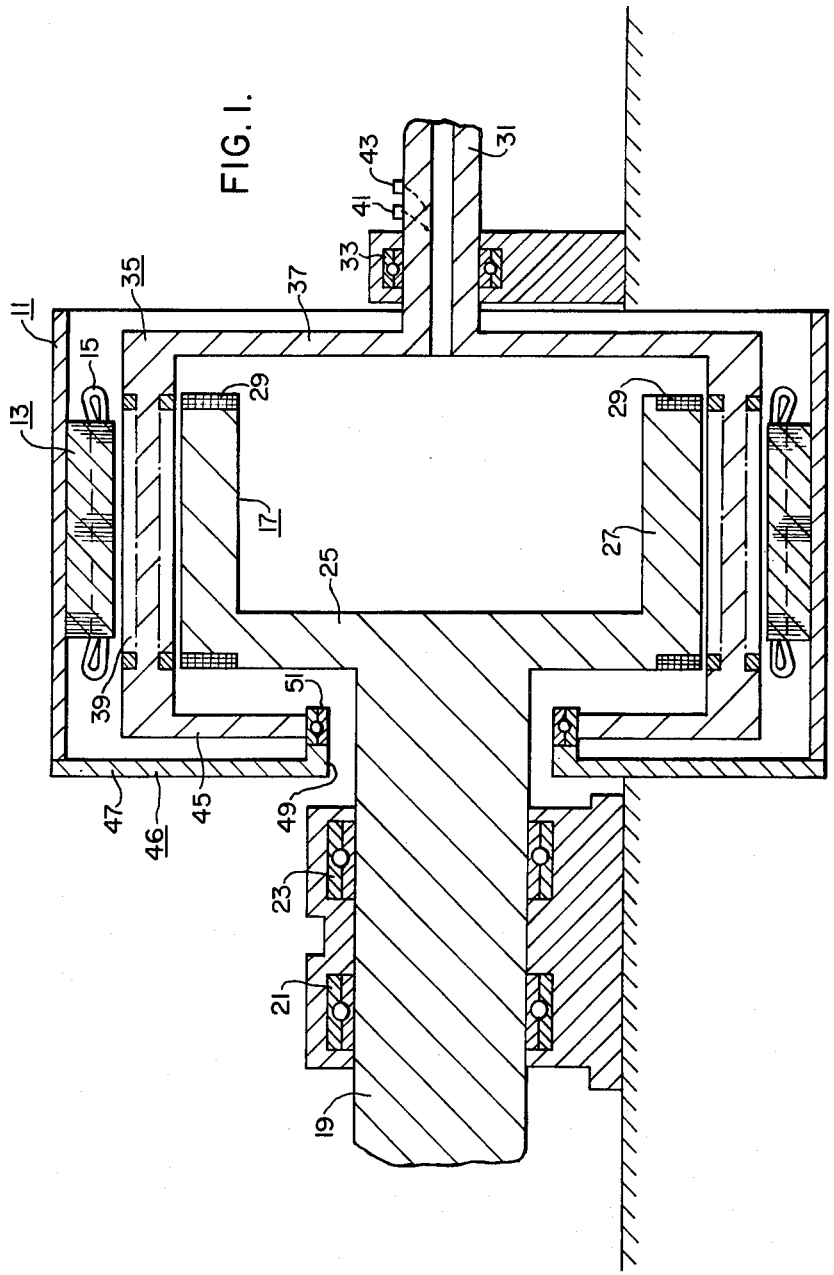
FIG. 1 is a schematic axial cross sectional view of a an AC dynamoelectric machine constructed in accordance with the present invention.

An AC dynamoelectric machine constructed in accordance with the present invention is schematically illustrated by the cross-sectional view of FIG. 1. As indicated previously, this description will relate to an AC motor, but the invention is not so limited.

The rotor of FIG. 1 is enclosed in a housing 11. Housing 11 in this particular embodiment is generally cylindrical, although it should be recognized that the housing and the enclosed motor could be made in other configurations, as required for particular applications. Generally cylindrical stator 13 is mounted on housing 11 and includes a stator or armature winding 15. Stator 13 and armature winding 15 are conventional.

A first rotor 17 is generally cylindrical and mounted coaxially with stator 13. In this particular embodiment rotor 17 is mounted internally of stator 13 and has a lesser radial dimension, although, of course, in some cases it may be desired to locate rotor 17 at a greater radial dimension than stator 13. Rotor 17 is connected to the drive shaft 19, which is mounted for rotary motion by bearings 21 and 23. A connection between drive shaft 19 and rotor 17 is made through an end plate 25 located at one end of rotor 17. Rotor 17, endplate 25 and drive shaft 19 may be connected together in any appropriate way, although the unitary structure of these parts illustrated in FIG. 1 is the preferred embodiment. The body 27 of rotor 17 is formed of iron or other ferromagnetic material. An induction winding, such as a squirrel cage winding 29, is located on the ferromagnetic body 27. Squirrel cage winding 29 is shorted at the ends of the machine by low resistance end rings, which are known in the art.

A support shaft 31 extends into the housing 11 from the opposite direction to that of the drive shaft 19. Support shaft 31 is mounted for rotation on a bearing 33. Support shaft 31 carries a second rotor 35, which is connected to the support shaft 31 by an endplate 37. Rotor 35 is located between stator 13 and the first rotor 17 and includes a superconducting field winding 39. Current for the superconducting field winding 39 is provided through brushes 41 and 43, while a cryogenic refrigerant is conveyed through support shaft 31 and endplate 37 to winding 39. In order to more accurately locate rotor 35 between stator 13 and rotor 17, an extending flange 45 is formed on the end of rotor 35 opposite support shaft 31. An L-shaped portion 46 of housing 11 has a radially inwardly extending leg 47 and an axially extending foot 49. The end flange 45 is located on foot 49 by a bearing 51 to provide a mounting permitting rotation of flange 45 with respect to housing 11.

While rotor 17 and 35 have been shown as mounted in separate bearings, an alternative construction would be to mount rotor 17 in bearings located on rotor 35. However, the low speed differential between rotors 17 and 35 could cause lubriation problems. Therefore, the cantilevered rotor 17 configuration illustrated in FIG. 1 is easier to construct, from a bearing point of view.

Figure 2:
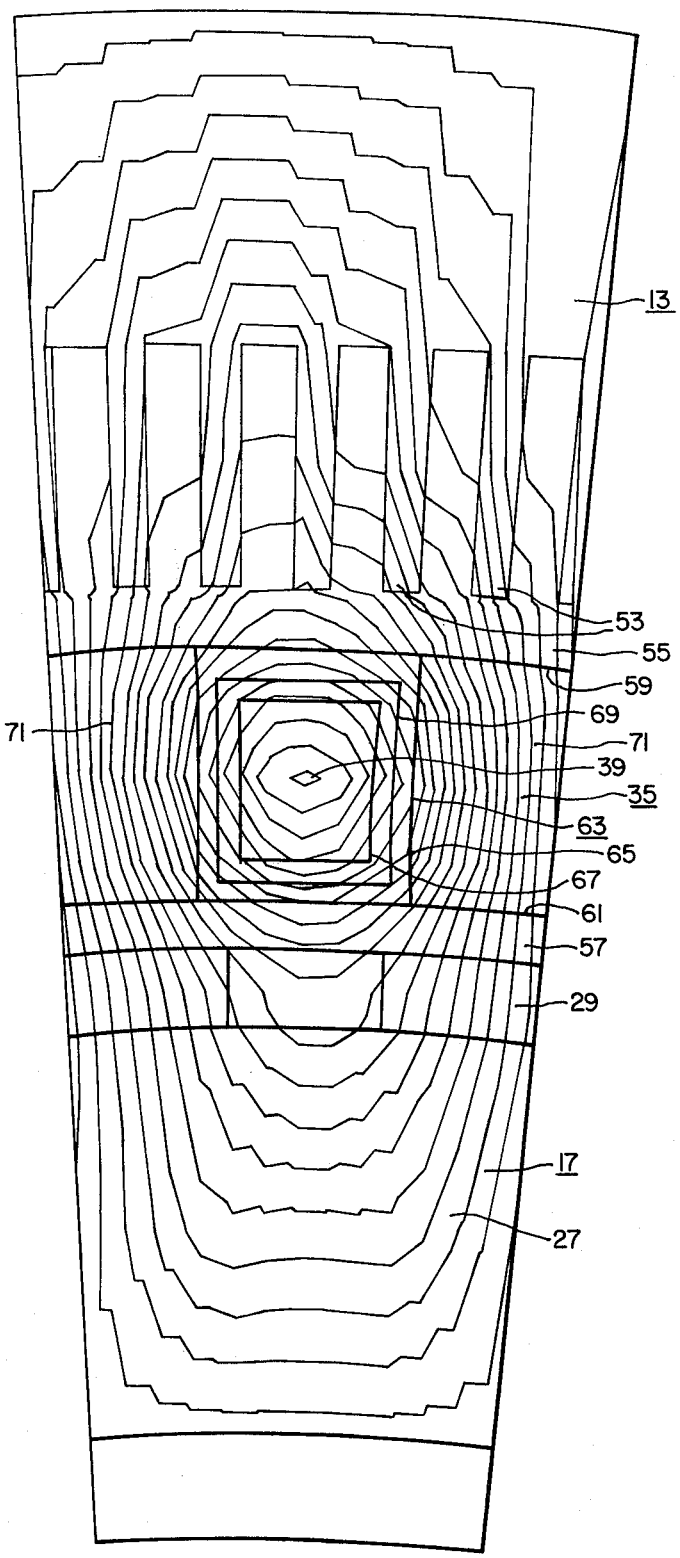
FIG. 2 is a schematic cross-sectional view of one pole pitch of the machine of FIG. 1, including an illustration of the flux paths.

FIG. 2 further clarifies some details of construction of the machine of FIG. 1. Thus it may be seen that stator 13 is shown as including teeth 53. Stator or armature winding 15 would be a conventional three-phase winding embedded in the laminated core and teeth of stator 13, as shown, or it could be an airgap winding with laminations in the core region only. The choice of the stator configuration depends on the design value of flux density in the winding region.

An air gap 55 separates the inner circumference of stator 13 from rotor 35, while an air gap 57 separates rotor 35 from rotor 17.

It may be seen that rotor 35 has an outer shell 59 and an inner shell 61. Shells 59 and 61 are thin structures of high strength material. In the chamber formed between shells 59 and 61 the superconducting winding 39 is located in a dewar vessel 63. Dewar vessel 63 has an outer wall 65, an inner wall 67, and a radiation shield 69 located in the vacuum chamber between walls 65 and 67. Magnetic poles 71 are located on either side of the dewar vessel 63. In an alternative construction shells 59 and 61 could form the walls of the dewar vessel, in which case radiation shield 69 would be located between the winding and the pole body to keep the magnetic pole structure at ambient temperature.

In operation, the outer shell 59 of rotor 35 would be made of conductive material to provide an induction winding for rotor 35. Upon energization of armature winding 15, rotor 35 would quickly be brought to synchronous speed as a result of the induction motor effect realized by shell 59 acting as a squirrel cage winding. Since rotor 35 is not loaded, the time to accelerate this rotor to synchronous speed would be very short and, as a result, the exposure of the superconductive winding 39 to low frequency AC fields is very short and the AC losses are minimal. To further reduce the AC losses, a reduced potential voltage may be applied to the stator winding 15 during starting in order to reduce the strength of the AC fields emanating from this winding.

When rotor 35 reaches synchronism with the AC field of winding 15, field current is supplied to the superconductive field winding 39. As this current builds up in winding 39, the magnetic coupling between rotor 35 and rotor 17 produces a torque that eventually is great enough to accelerate rotor 17. As current in the field winding 39 reaches its normal operating value, the inner rotor 17 reaches an operating slip speed that is a few revolutions per minute (RPM) below synchronous speed. Thus, the starting time is controlled by the charging rate of field current, with the torque developed varying approximately as the square of the field current applied to superconductive winding 39. Throughout the period during which rotor 35 is being started to drive the load, the outer rotor 35 remains in synchronism with the rotating stator flux produced by winding 15. As a result, there are no AC losses generated in the superconductive winding during this period of operation.

As illustrated by the flux lines in FIG. 2, the configuration of this invention produces excellent magnetic coupling between the superconducting field winding 39 and the stator 15, as well as between field winding 39 and the induction or squirrel cage winding 29 of rotor 17. At the same time, asynchronous AC losses in the superconducting winding 39 are held to a minimum. Therefore, a structure has been provided in which the benefits of the high field produced by a superconducting field winding are realized, without the AC losses that would otherwise occur during starting and other periods of asynchronous operation.

Another advantage of the structure described above is that this motor may also operate as a reluctance-asynchronous motor at reduced power levels without field current as in the case of a loss of refrigeration. This capability is particularly advantageous in ship propulsion applications. A complete loss of shaft power will result in a loss of ship control. Only a small percentage of full load power is required to maintain control, and this small percentage of full load power can be supplied by the configuration of this invention, even if the superconducting field winding 39 is inoperative.

It should be understood that various modifications, changes and variations may be made in the arrangements, operations and details of construction of the elements disclosed herein without departing from the spirit and scope of the present invention.

I claim:

1. A superconductive AC dynamoelectric machine comprising:
   a stator having a stator winding located thereon;
   a first rotor connected to the drive shaft of the machine and mounted for rotation therewith, said first rotor having a first rotor winding located thereon; and
   a second rotor mounted for rotation and bearing a superconducting field winding designed to operate at cryogenic temperature located between said stator and said first rotor, said second rotor comprising
   a first shell adjacent said stator; and
   a second shell adjacent said first rotor, said first and second shells forming a chamber therebetween to contain said superconducting field winding and magnetic material forming magnetic poles.

2. A machine as claimed in claim 1 wherein said first rotor winding is a squirrel cage winding with both ends thereof shorted.

3. A machine as claimed in claim 1 wherein said first rotor is formed of magnetic material with one end connected to the drive shaft.

4. A machine as claimed in claim 1 wherein said superconducting field winding is enclosed in a dewar vessel separating it from said magnetic poles.

5. A machine as claimed in claim 1 wherein said first shell is constructed of electrically conductive material.

6. A machine as claimed in claim 1 wherein said first rotor winding is designed to operate near ambient temperature.

7. A superconductive AC dynamoelectric machine comprising:
   a housing;
   a generally cylindrical stator including an armature winding;
   a generally cylindrical first rotor including a first rotor winding;
   a first end plate integrally secured to one end of said first rotor;
   a drive shaft mounted for rotation, said drive shaft being affixed to said first end plate;
   a generally cylindrical second rotor located between said stator and said first rotor and including a superconducting field winding;
   a second end plate integrally secured to one end of said second rotor;
   a support shaft mounted for rotation, said support shaft being affixed to said second end plate, said support shaft and said second end plate are adapted to convey refrigerant to said superconducting field winding; and said second rotor comprises
   a first shell adjacent said stator; and
   a second shell adjacent said first rotor, said first and second shells forming a chamber therebetween to contain said superconducting field winding enclosed in a dewar vessel and magnetic material forming magnetic poles.

8. A machine as claimed in claim 7 wherein:
   said first rotor is concentric with said stator and located internally thereof; and
   said second rotor is concentric with said stator and said first rotor.

9. A machine as claimed in claim 7 wherein said second rotor further comprises a radially extending flange abutting said housing with a mounting permitting rotation of said flange with respect to said housing.

* * * * *